United States Patent [19]

Nguyen et al.

[11] Patent Number: 5,956,097
[45] Date of Patent: Sep. 21, 1999

[54] SYSTEM FOR AUTOMATICALLY CONTROLLING THE TUNING OF TELEVISION RECEIVER RECEIVING CHANNELS

[75] Inventors: Jino Nguyen, Betton; Yves Maetz, Rennes, both of France

[73] Assignee: Thomson multimedia S.A., Coubervoie, France

[21] Appl. No.: 08/666,306
[22] PCT Filed: Nov. 3, 1995
[86] PCT No.: PCT/FR95/01451
§ 371 Date: Nov. 12, 1996
§ 102(e) Date: Nov. 12, 1996
[87] PCT Pub. No.: WO96/14709
PCT Pub. Date: May 17, 1996

[30] Foreign Application Priority Data

Nov. 4, 1994 [FR] France .................................. 94 13235

[51] Int. Cl.⁶ ....................................................... H04N 5/50
[52] U.S. Cl. .......................... 348/731; 348/735; 348/552
[58] Field of Search .................................... 348/536, 547, 348/731, 733, 735, 5, 552; 386/1, 46, 83; 455/180.1, 184.1, 185.1, 187.1; H04N 5/50

[56] References Cited

U.S. PATENT DOCUMENTS 4,622,583  11/1986  Watanabe .
5,291,343  3/1994  Goto ......................................... 348/731
5,661,526  8/1997  Hamamoto ............................... 348/731

FOREIGN PATENT DOCUMENTS 243740  11/1987  European Pat. Off. .
371749   6/1990  European Pat. Off. .
618721  10/1994  European Pat. Off. .

*Primary Examiner*—Sherrie Hsia
*Attorney, Agent, or Firm*—Joseph S. Tripoli; Peter M. Emanuel; Robert D. Shedd

[57] ABSTRACT

A video receiving device (A) that includes a circuit for receiving first video signals from a remote transmitter, a circuit for receiving second video signals from another video receiver (TVS), a circuit (TU1) for automatic searching for transmission channels, and a circuit (PC) for phase comparison between the vertical synchronization signals of the first video signals and the vertical synchronization signals of the second video signals that can output an "outphasing" signal that is used for controlling the operation of the automatic channel search circuit, wherein the video receiving device (A) also includes a control circuit (CC) that enables the video signals that it is receiving to be displayed for a pre-determined time on the other video receiver (TVS). The invention is applicable notably to the programming of video recorders, and to the automatic tuning of such a recorder to the channel being viewed on a TV receiver in order to enable simple and immediate recording of this channel.

6 Claims, 3 Drawing Sheets

SYSTEM FOR AUTOMATICALLY CONTROLLING THE TUNING OF TELEVISION RECEIVER RECEIVING CHANNELS

BACKGROUND OF THE INVENTION

The invention relates to a device for video reception, in particular a control system for subjecting the channel selection of a video receiver to the channels of another video receiver. The invention is applicable notably to the automatic tuning of a video cassette recorder (VCR) connected to a television (TV) receiver.

DESCRIPTION OF THE PRIOR ART

In known VCR machines, when a user wishes to record a TV program he must adapt his VCR to the channel corresponding to the TV's reception channel. In practice, when selecting the channel on the VCR, he must make sure that the number of the selected channel appears on the VCR's display; this is the only way of making sure that the right channel has been selected.

If we assume that such a user always has a TV receiver that can operate at the same time as the VCR he intends to use, the invention proposes to use the TV receiver for selecting the program (channel) to be recorded and for automatically adjusting the VCR to the channel selected on the TV receiver.

In these conditions, when the user wishes to record a TV program received via an antenna or a cable network, for example, he selects on his TV receiver the channel on which the program will be broadcast. The VCR connected to this TV will then be adjusted automatically to the same receiving channel as the TV receiver. The European patent application EP 0618 721 A2 describes a VCR fitted with a reception circuit that can be tuned to several channels and connected to a TV receiver which in turn can be tuned to several receiving channels. Once the TV receiver is tuned to a given channel, it displays the video signals and emits the audio signals received while also feeding them to the VCR. The latter also includes a circuit for comparing at least one component of the signal received directly by the VCR with the corresponding component of the signal that the VCR receives from the TV receiver. This comparison circuit is designed to output an "equality" signal if the signals compared are the same, i.e. when the two devices are tuned to the same channel, and an "inequality" signal when this is not the case, in which case the VCR will automatically search for the channel being received by the TV receiver. However, two different channels may have two vertical synchronization signals in phase. In this case, the comparison circuit chances to validate the tuning of the VCR receiver on a channel different from the one to which the TV receiver is tuned.

The object of the invention is liberate from this problem of tuning of the VCR receiver on a channel different from the one to which the TV receiver is tuned in case two different channels have two vertical synchronization signals in phase, which is a significant improvement over the device described in the patent application EP 0618 721 A2.

SUMMARY OF THE INVENTION

The present invention concerns a video receiving device (A) that includes a circuit for receiving first video signals from a remote transmitter, a circuit for receiving second video signals from another video receiver (TVS), a circuit for automatic searching for transmission channels, and a circuit for phase comparison between the vertical synchronization signals of said first video signals and the vertical synchronization signals of said second video signals that can output an "outphasing" signal that is used for controlling the operation of said automatic channel search circuit, wherein said video receiving device (A) also includes a control circuit (CC) that enables the video signals that it is receiving to be displayed for a pre-determined time on said other video receiver (TVS).

An important characteristic of the invention is that said control circuit (CC) includes a timer (TIME) controlled by the control unit of said video receiving device when it is informed that the phases of said vertical synchronization signals are the same. Said timer orders, for a pre-determined time period, the transmission of the video signals received by said video receiving device to said other video receiver (TVS), along with a signal (PIN8) indicating to this other video receiver (TVS) that it must display these video signals.

BRIEF DESCRIPTION OF THE DRAWINGS

The invention will be better understood and other advantages and characteristics will become clear on reading the following description of an embodiment, taken only as a non-limitative example, making reference to the appended figures, of which.

In television transmission systems, we observe that all the transmission channels do not have the same time origin. Even when two channels transmit the same image from the same transmitter, the images of the two channels are not perfectly in phase. More precisely, we observe that the vertical synchronization signals of the two channels are out of phase. Therefore, to determine whether two receivers are both tuned to the same channel we can check that vertical synchronization signals of the two signals are in phase.

Figure 1:
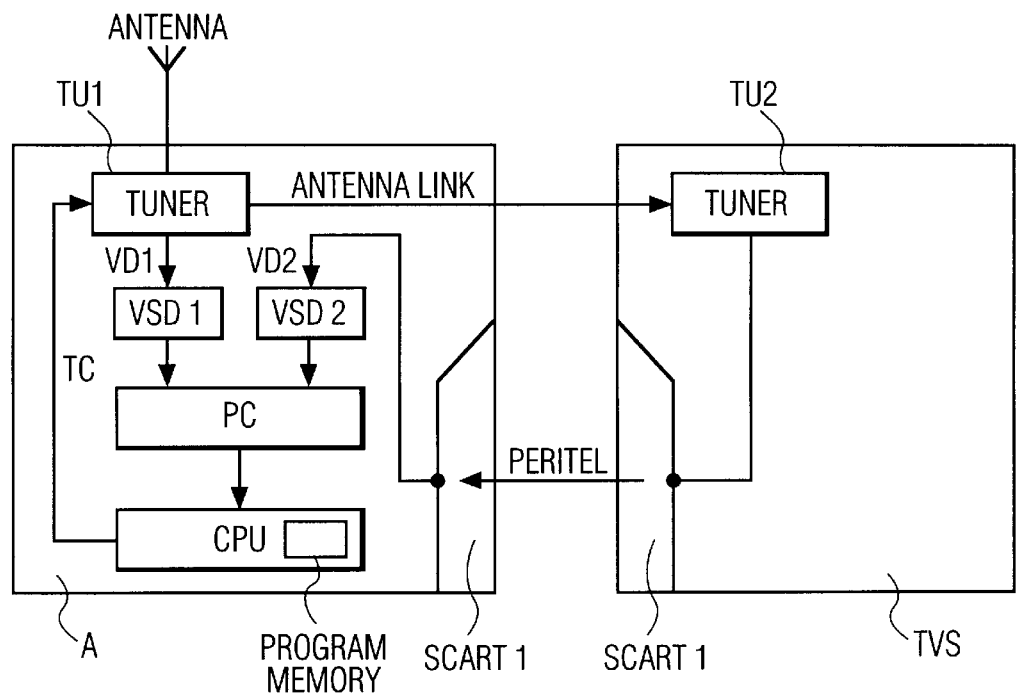
FIG. 1 is a an example of a circuit that can be used to implement the invention.

In FIG. 1, one of the devices has circuits providing for this verification.

For example, the device TVS is a TV receiver; it is tuned to a given channel and receives a program via its tuner TU2.

The receiving device A is a VCR, for example. The user wishes to record a program while he is viewing it on the receiver TVS.

The VCR has a TV reception circuit or tuner TU1 that incorporates an automatic channel searching circuit. A control unit CPU controls this automatic searching function of the tuner TU1 and also provides for the general management of the recorder.

The circuit TU1 receives video signals VD1, for example via an antenna, and feeds them to a circuit VSD1 which detects the vertical synchronization signal.

Figure 4:
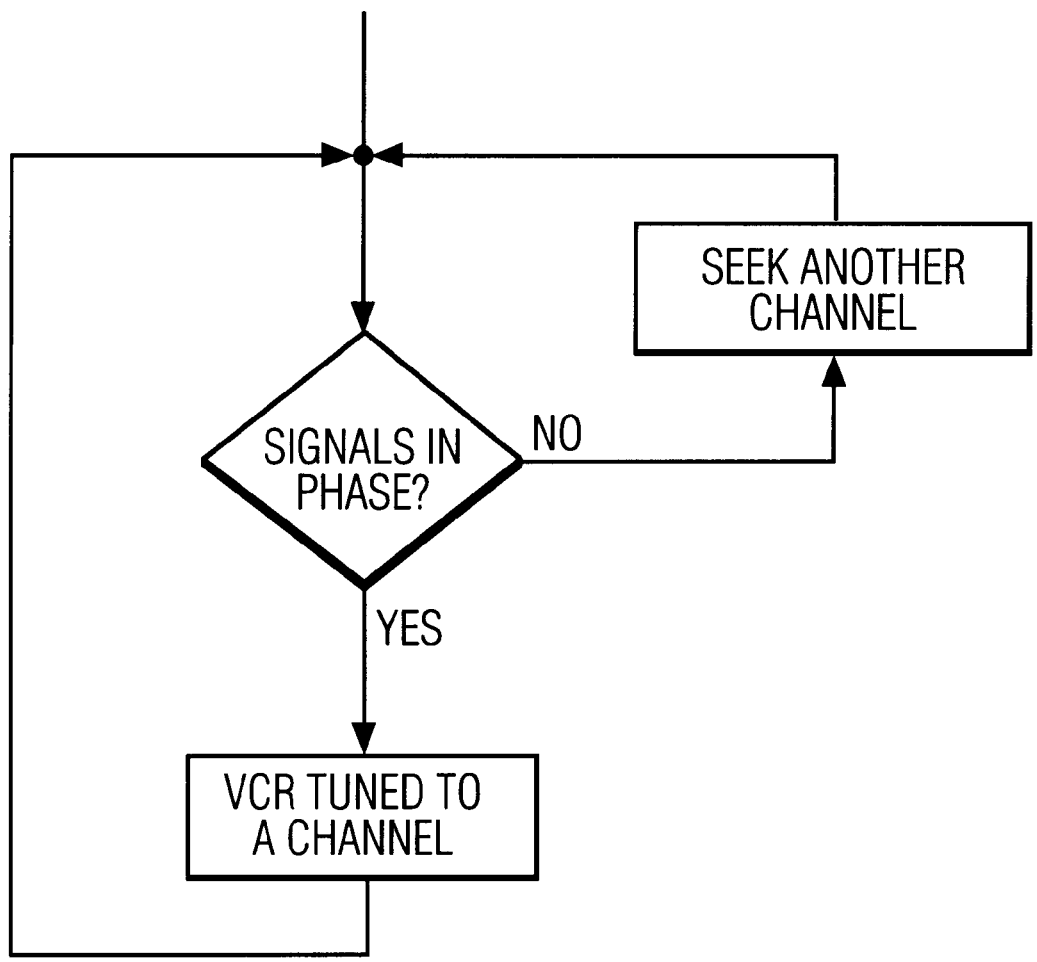

In addition, the receiver TVS feeds the video signals it is receiving to the VCR via a cable such as a peritel cable. These video signals are received by another vertical synchronization signal detection circuit VSD2. The detection circuits VSD1 and VSD2 feed the times of detection of the vertical synchronization signals to a phase comparator circuit PC. If these synchronization signals detected by the circuits VSD1 and VSD2 are out of phase, this means that the tuners of the video recorder VCR and the TV receiver are not tuned to the same receiving channel. The phase comparator PC feeds an "outphasing" signal to the control unit CPU which then triggers the automatic channel search function in the VCR (see FIG. 4).

If the synchronization signals are in phase, the circuit PC sends an "in-phase" signal to the control unit CPU which then knows that the VCR is tuned to the same channel as the TV receiver. Moreover, this system operates continuously to detect any change of channel. The control unit CPU is then ready to receive an instruction from the user, a record instruction for example.

The system according to the invention can also be used to program the VCR, in other words to program the table of correspondences between program selection buttons and reception channels.

In this case, the receiver TVS having been programmed, for each program (channel) displayed on the receiver TVS, the control unit CPU of the VCR is set to programming mode and given a first channel number. This microprocessor CPU then orders an automatic channel search which continues until the vertical synchronization signal of the video signal received from the antenna is in phase with the vertical synchronization signal of the video signal received from the TV receiver TVS. When the two signals are found to be in phase, this means the recorder is tuned to the same channel as the receiver TVS; the control unit CPU is informed and this unit then memorizes the channel number and the program number in a program memory.

The user can then change the program (and therefore in principle the channel) on his TV receiver TVS. He then sends another command to the control unit CPU to put it in programming mode and chooses a second program number. The search processes described previously is then repeated: the automatic channel search circuit searches for the same channel as the one received by the TV receiver, then the control unit CPU memorizes the channel number identified in a program memory. This process can be repeated to memorize all the programs.

Figure 2:
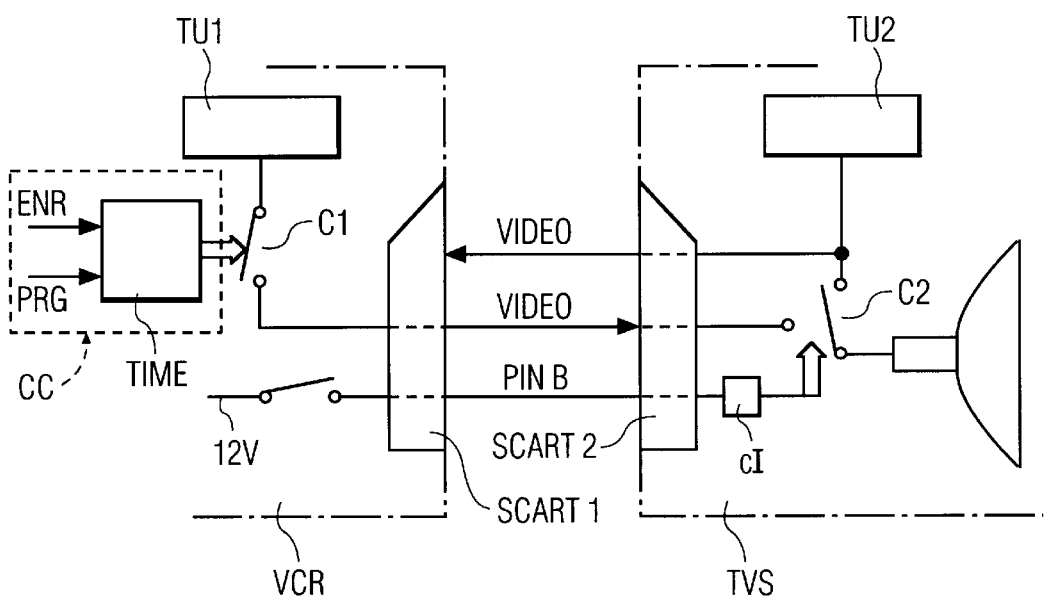
FIG. 2 is the circuit according to the invention.

In order to be sure that the VCR is correctly tuned to the same channel as the one displayed on the TV receiver, either in programming mode or recording mode of the VCR, a control circuit CC is provided as shown in FIG. 2. This includes a timer circuit TIMER that is activated either by a signal ENR (in recording mode), or by a signal PRG in programming mode and that transmits the video images received by the VCR to the receiver TVS via the peritel cable by closing the switch C1 for a predetermined time. At the same time, a slow switching signal is sent to the pin (PIN8) of the peritel connector to ensure that the TV receiver TVS connects its reception circuits (via switches C1 and C2) to the peritel cable in order to display on the screen the video signals from the VCR. At the end of the predetermined time the voltage on PIN8 is dropped, the recorder applying a zero voltage so that the receiver reconnects its circuits to the antenna. In this manner, for a short time determined by the timer TIME the user can view the video program that the VCR is receiving and recording.

Figure 3:
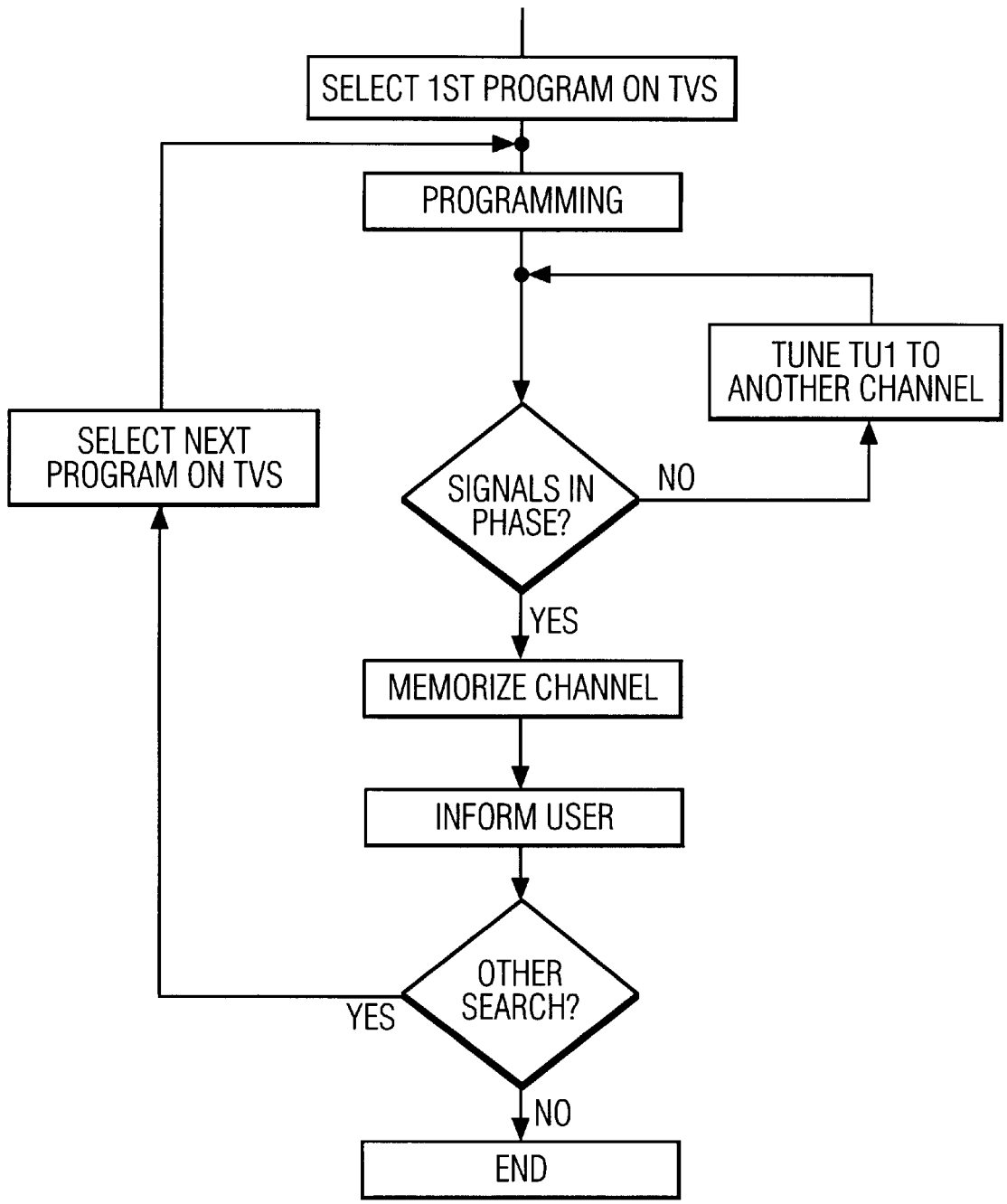
FIGS. 3 and 4 are flow charts explaining the operation of the system.

FIG. 3 is a flow chart explaining the operation of a system that enables the program memory of one receiver, TVS for example, is copied into that of another receiver such as the VCR.

In a first step, the user selects the first program on the receiver TVS and switches the receiver VCR to programming mode.

In the VCR the system searches for the reception of the same channel as the receiver TVS by comparing the phases of the vertical synchronization signals received by the two devices. As long as these signals are out of phase the system repeats the search on the next channel. Once a synchronization of the phases is detected, the channel number is memorized with the program number. A signal is sent to the user to confirm that the program has been memorized. The user can then stop the programming, or he can continue by selecting the next program on the receiver TVS, in which case another automatic programming cycle is performed, and so on.

In the description above, the invention is explained with reference to a video recorder (VCR) and a television receiver. However, it is clear that the principle is applicable to any other type of device capable of receiving video programs.

What is claimed is:

1. A video receiving device including a circuit for receiving first video signals, a circuit for receiving second video signals from another video receiver, a circuit for automatic searching for transmission channels, and a circuit for comparing a phase between the vertical synchronization signals of said first video signals and the vertical synchronization signals of said second video signals and providing an "outphasing" signal used for controlling the operation of said automatic channel search circuit based upon the comparison, wherein said video receiving device also includes a control circuit for enabling the first video signals to be displayed for a predetermined time on said another video receiver.

2. Video receiving device according to claim 1, wherein said video receiving device (A) is a video recorder (VCR) and includes a control unit (CPU) that controls the operation of said video recorder and said automatic channel search circuit (TU1), said control unit activating said automatic channel search circuit for as long as said phase comparison circuit detects that said vertical synchronization signals are out of phase, and deactivating said automatic channel search circuit when said phase comparison circuit detects that said vertical synchronization signals are in phase.

3. Video receiving device according to claim 2, wherein said control circuit includes a timer, wherein when said vertical synchronization signals are detected to be in phase, said timer directs the first video signals received by said video receiving device to said another video receiver for a predetermined time period, along with a signal causing the another video receiver to display the first video signals.

4. Video receiving device according to claim 2, wherein said control unit (CPU) includes a program memory and means of operating in programming mode, said control unit (CPU) supplying a channel number detected when said phase comparison circuit detects that said vertical synchronization signals are in phase, said channel number being memorized in said program memory along with a preselected program number.

5. Video receiving device according to claim 2, wherein said control unit (CPU) includes means of operating in recording mode, said operating means switching said video recorder into recording mode when said phase comparison circuit detects that said vertical synchronization signals are in phase.

6. Video receiving device according to claim 1, including a peritel-type connector enabling said video receiving device to be connected to said another video receiver and to receive said second video signals.

* * * * *